United States Patent [19]

Tsukada

[11] Patent Number: 5,308,167
[45] Date of Patent: May 3, 1994

[54] LINEAR GUIDE APPARATUS WITH LATERAL POSITION ADJUSTING MECHANISM

[75] Inventor: Toru Tsukada, Maebashi, Japan

[73] Assignee: NSK Ltd., Tokyo, Japan

[21] Appl. No.: 996,633

[22] Filed: Dec. 24, 1992

[30] Foreign Application Priority Data

Jan. 13, 1992 [JP] Japan ................................ 4-3965

[51] Int. Cl.⁵ ..................... F16C 29/06; F16C 29/04
[52] U.S. Cl. ......................................... 384/45; 384/43
[58] Field of Search ................. 384/43, 44, 45; 248/287, 295.1, 297.2

[56] References Cited

U.S. PATENT DOCUMENTS

| | | | |
|---|---|---|---|
| 4,033,539 | 7/1977 | Bandocz | 248/287 |
| 4,614,382 | 9/1986 | Teramachi | 384/45 |

Primary Examiner—Daniel P. Stodola
Assistant Examiner—John Q. Nguyen
Attorney, Agent, or Firm—Shapiro and Shapiro

[57] ABSTRACT

In a linear guide apparatus, a plurality of threaded holes (21) is formed in both side surfaces (1b) of a guide rail (1) in perpendicular to the side surfaces. The threaded holes are arranged coaxially and in a pair and are disposed symmetrically with respect to a longitudinal direction (axial direction) of the guide rail. Lateral pushing bolts (22) are threaded into the respective threaded holes. A plurality of threaded holes (25) are also formed in both side surfaces (41b) a slider body (41). These threaded holes (25) are also arranged coaxially and in a pair and are disposed symmetrically with respect to a shifting direction of a slider (2). Lateral pushing bolts (26) are also threaded into the respective threaded holes (25).

3 Claims, 7 Drawing Sheets

LINEAR GUIDE APPARATUS WITH LATERAL POSITION ADJUSTING MECHANISM

BACKGROUND OF THE INVENTION

1. Field of the Invention

The present invention relates to a linear guide apparatus attached to machines or apparatuses such as machine tools, measuring apparatuses or the like, having a linearly movable portion, to support and guide such movable portion, and more particularly, it relates to a linear guide apparatus previously including lateral pushing means so as to be easily attached to such machines or the like.

2. Related Background Art

Figure 8:
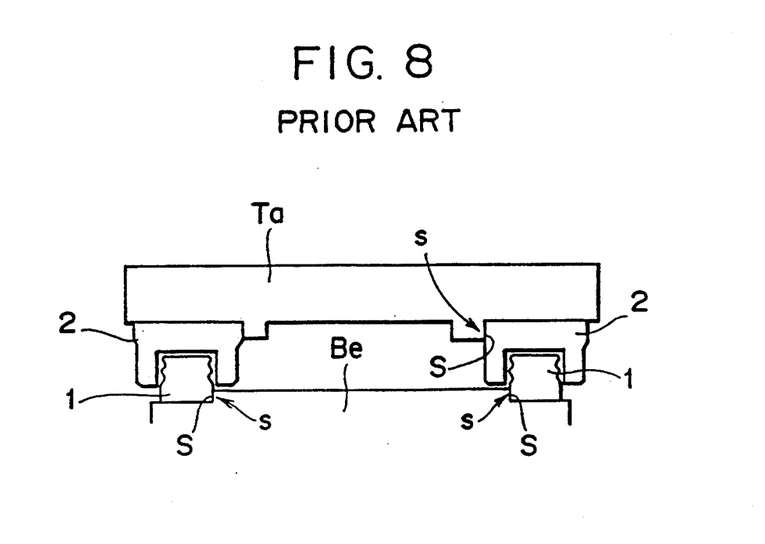
FIG. 8 is an elevational view of a conventional linear guide apparatus.

As shown in FIG. 8, in an example of a linear guide apparatus, sliders 2 each having an inverted U-shaped cross-section slidably ride on two corresponding guide rails 1 secured to a bed Be which is a base of a machine by bolts, so that the sliders 2 can be smoothly shifted by the rotation of rolling bodies (such as balls or rollers) received in rolling body receiving grooves formed in opposed surfaces of the guide rails 1 and of the sliders 2. The sliders 2 are generally secured to a table Ta of the machine which is an attachment member by bolts.

In attaching the linear guide apparatus to the machine, in order to ensure the attaching accuray, steps and/or recesses are previously formed in the bed Be and/or table Ta of the machine, and side surfaces (reference surfaces) s of the guide rails 1 and/or sliders 2 are laterally abutted against side surfaces S of the steps and/or recesses, thereby preventing the deviation of the rails and sliders due to the shock or impact applied thereto.

Figure 9:
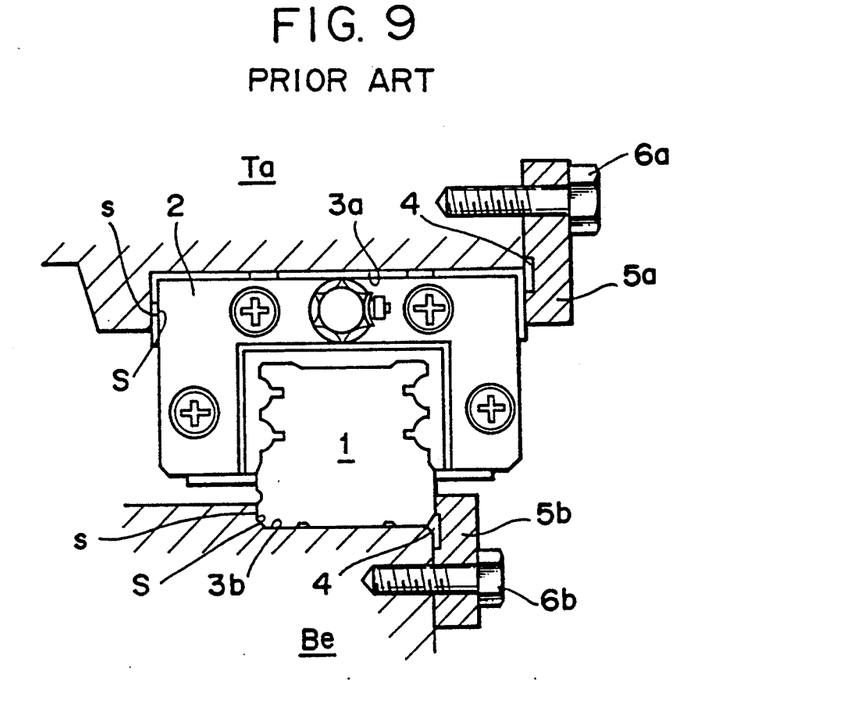
FIGS. 9 to 11 are elevational views of conventional attaching means.
Figure 10:
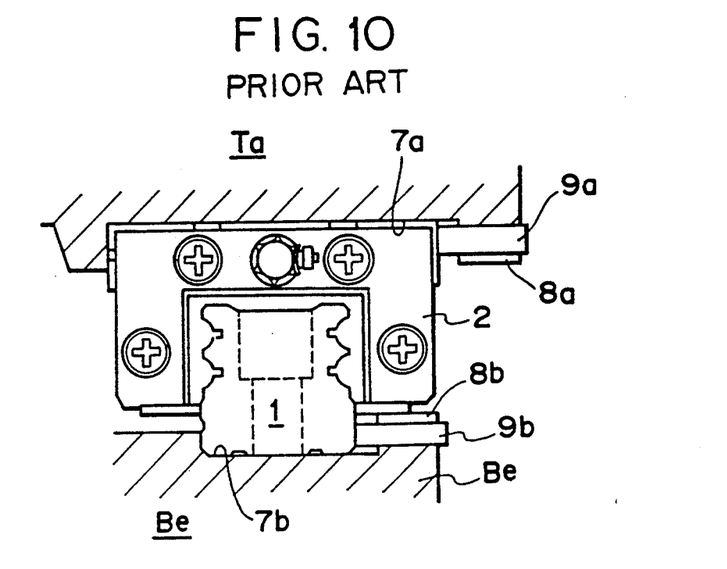
Figure 11:
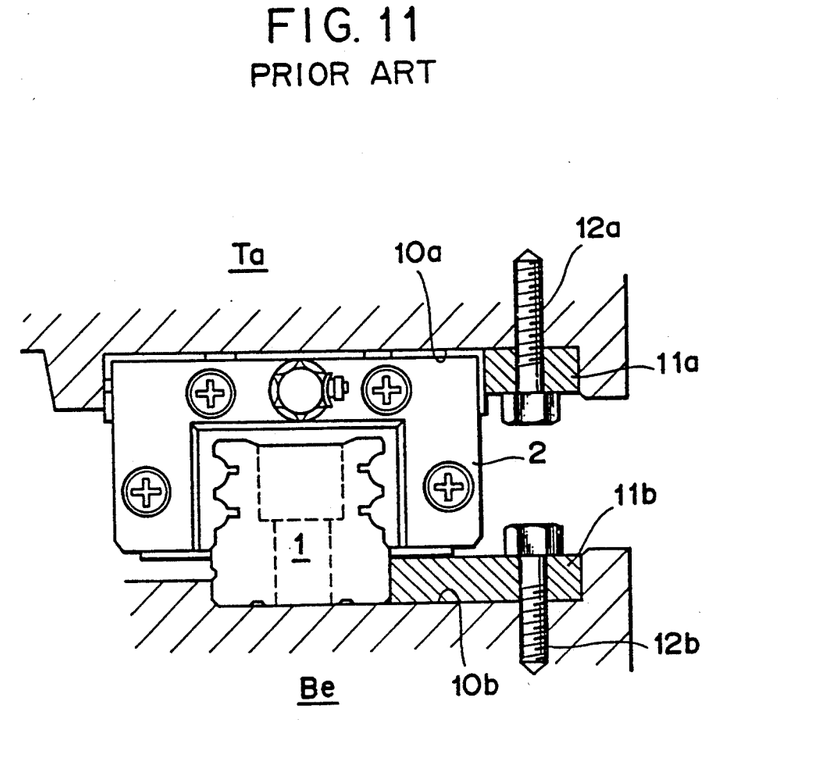

In the past, lateral pushing plates have been used as the lateral pushing means, as shown in FIGS. 9 to 11 in detail.

In the lateral pushing means shown in FIG. 9, there are formed steps 3a, 3b on the table Ta and the bed Be of the machine, each of which steps has a width such that the side surfaces of the guide rail 1 and the slider 2 to be laterally pushed are slightly protruded outwardly. As shown in FIG. 9, lateral pushing plates 5a, 5b each having a flank portion 4 are abutted against the side surfaces of the table and the bed and are secured to the latter by bolts 6a, 6b, thereby urged the guide rail 1 and the slider 2 laterally.

In the lateral pushing means shown in FIG. 10, a recess 7b having a width slightly greater than that of the guide rail 1 is formed in the bed Be, and a recess 7a having a width slightly greater than that of the slider 2 is formed in the table Ta. The guide rail 1 and the slider 2 are freely housed in the recesses 7b, 7a in registration with one sides of the latter and lateral pushing bolts 9b, 9a threaded into threaded holes formed in banks 8b, 8a of the recesses 7b, 7a are tightened, thereby urging the guide rail 1 and the slider 2 laterally in the recesses 7b, 7a of the bed Be and the table Ta.

In the lateral pushing means shown in FIG. 11, recesses 10a, 10b having widths considerably greater than those of the slider 2 and the guide rail 1, respectively, are formed in the table Ta and the bed Be, respectively. The slider 2 and the guide rail 1 are freely housed in the recesses 10a, 10b in registration with one sides of the latter. Flat lateral pushing spacers 11a, 11b having widths slightly greater than the remaining widths of the recesses 10a, 10b, respectively, are prepared. Then, the ends of the spacers are polished or filed to match the remaining recesses and are fitted into the remaining recesses 10a, 10b. Thereafter, the spacers are fixed to the table and the bed by bolts 12a, 12b.

However, in the above-mentioned linear guide apparatuses, the lateral pushing means used to correctly attach the guide rails 1 and the sliders 2 to the aimed machine with high accuracy was not involved in the linear guide apparatus. Thus, an operator must prepare lateral pushing members such as lateral pushing plates, lateral pushing bolts, lateral pushing spacers and the like, and must provide threaded holes in the table Ta and the bed Be by machining operation, for attaching these lateral pushing members to the table and the bed.

Accordingly, it is necessary for the operator to prepare the lateral pushing members independently from the linear guide apparatus, and it is troublesome to control and design such lateral pushing members and to attach such lateral pushing members to the machine. Further, there arises a problem that much labor and cost are required to provide a plurality of small threaded holes in the large-sized machine and to work the lateral pushing members themselves.

On the other hand, since machines manufactured by makers have various spaces for attaching the linear guide apparatus, it is difficult to standardize the lateral pushing members.

Furthermore, since the side surfaces (reference surfaces) s of the guide rails 1 and the sliders 2 of the linear guide apparatus are directly abutted against the reference side surfaces S of the steps 3 or the recesses 7, 10 formed on the machine by the machining operation, if the working accuracy for the side surfaces of the steps or the recesses is low, the attaching accuracy (for example, straightness, parallelism and the like) for the linear guide apparatus is badly affected. In this case, to enhance the straightness and the parallelism, the reference side surfaces of the machine must be worked with the predetermined high accuracy or more, thus increasing the labor and cost.

SUMMARY OF THE INVENTION

The present invention aims to eliminate the above-mentioned conventional drawbacks, and an object of the present invention is to provide a linear guide apparatus wherein rails and sliders previously include lateral pushing means therein and an positioning adjustment with respect to a bed or table can easily and quickly effected.

To achieve the above object, according to the present invention, there is provided a linear guide apparatus comprising at least one guide rail extending in an axial direction and being provided at its both side surfaces with axial grooves within which rolling bodies are rolled, and at least one slider freely riding on the guide rail for axial shifting movement, the guide rail and slider being adapted to be attached to attachment members of a machine. In such linear guide apparatus, there is provided at least one set of paired adjustment threaded holes are formed along a longitudinal direction of the guide rail, each pair of the adjustment threaded holes extending in a widthwise direction of the guide rail through both side surfaces of the guide rail at lower portions thereof and being aligned with each other, and adjusting threaded members are threaded into the corresponding adjustment threaded holes in such a manner that the other ends of the threaded members protrude from the side surfaces of the guide rail; and a recess having a width greater than that of the guide rail is formed in a guide rail attachment surface of a fixed member and a fixing threaded hole for receiving a fastening member is formed in a bottom of the recess. After a widthwise position of the guide rail on the fixed member has been adjusted by abutting the other ends of the adjusting threaded member against side surfaces of the recess by rotating the threaded members, the guide rail is fixed to the fixed member by tightening the fastening member.

In this respect, the linear guide apparatus is freely housed in the recesses previously formed in the bed and table (attachment members) of the machine and the fastening member (attaching bolt) is temporarily tightened. In this case, the adjusting threaded members (lateral pushing bolts) are completely threaded into the corresponding threaded holes. Then, the paired of lateral pushing bolts are unscrewed by rotating the latter by using a tool so that heads of the lateral pushing bolts are abutted against the opposed side surfaces of the recesses. Consequently, due to the reaction force, the side surfaces of the linear guide apparatus are positioned and fixed with respect to the side surfaces of the recesses via the bolt heads.

Thereafter, the attaching bolts are finally tightened, thereby fixing the linear guide apparatus in place on the bed and the table.

In this case, by adjusting the threaded conditions of the pair of left and right symmetrical lateral pushing bolts, the position of the linear guide apparatus housed in the recess can be finely adjusted in the left and right direction, thus positioning the linear guide apparatus properly. In this case, since the pair of bolts are axially symmetrical and coaxial in the left and right direction, even when the heads of the bolts are abutted against the opposed side surfaces of the recess, the lines of action of the reaction forces are generated on the same single line, thus preventing bending moment from acting on the linear guide apparatus.

Accordingly, it is possible to form recesses in the machine with accuracy lower than that of the conventional one and to finely adjust the attachment position of the table and the like of the machine.

Further, it is not required to independently prepare lateral pushing plates and the like for attaching the guide rails and the sliders correctly, and it is not needed to form threaded holes for attaching the lateral pushing plates in the bed and the table.

Furthermore, with respect to the attaching accuracy such as the straightness and the parallelism, it is possible to easily achieve high accuracy. Particularly, by adjusting the threaded conditions of the pair of left and right lateral pushing bolts, even if the attachment reference surfaces of the machine have no working accuracy as was required in the conventional tequnique, the fine adjustment in the left and right direction can be effected, thereby ensuring the attachment with higher accuracy.

DETAILED DESCRIPTION OF THE PREFERRED EMBODIMENTS

The present invention will now be explained in connection with embodiments thereof with reference to the accompanying drawings. Incidentally, in order to simplify the explanation, constructural elements same as or similar to those of the conventional techniques are designated by the same reference numerals and the detailed explanation thereof will be omitted.

Figure 1:
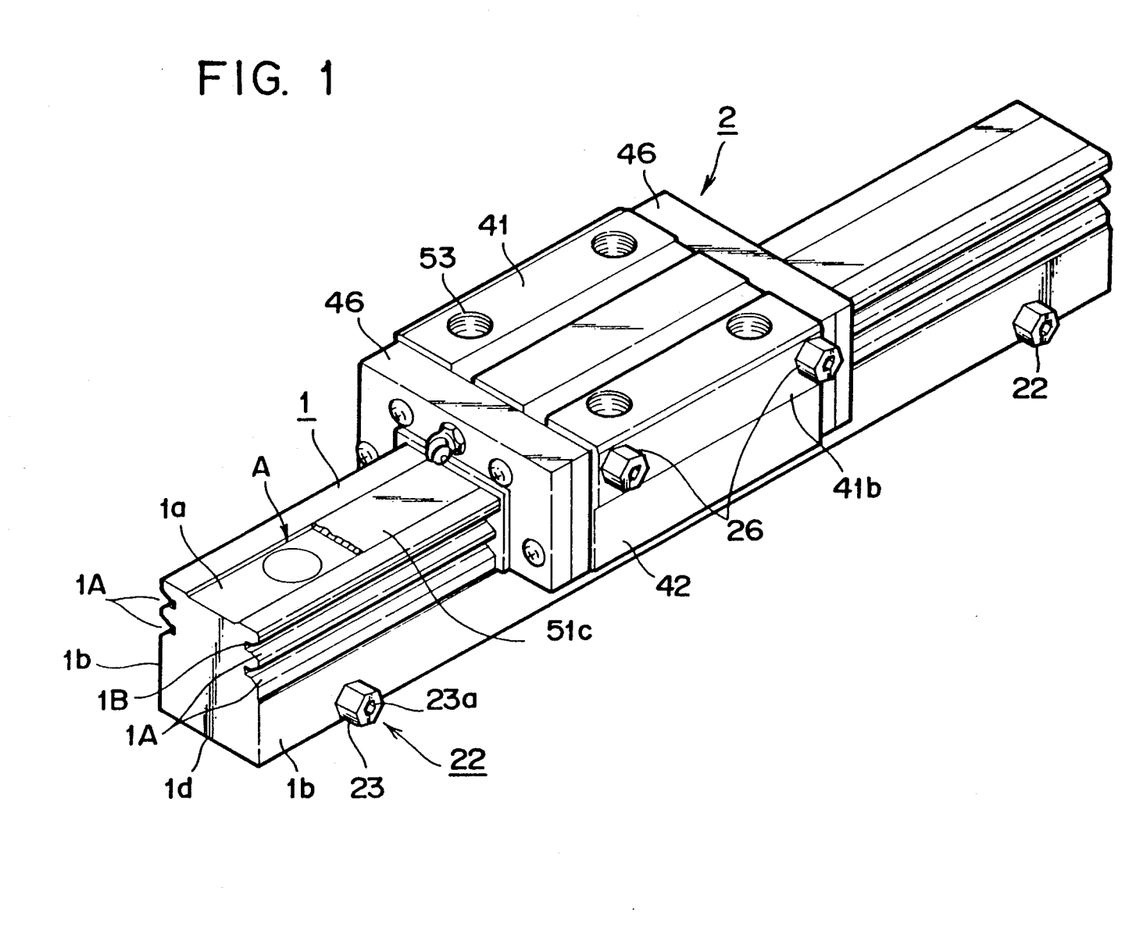
FIG. 1 is a general perspective view of a linear guide apparatus having a lateral pushing structure, according to a preferred embodiment of the present invention.
Figure 2:
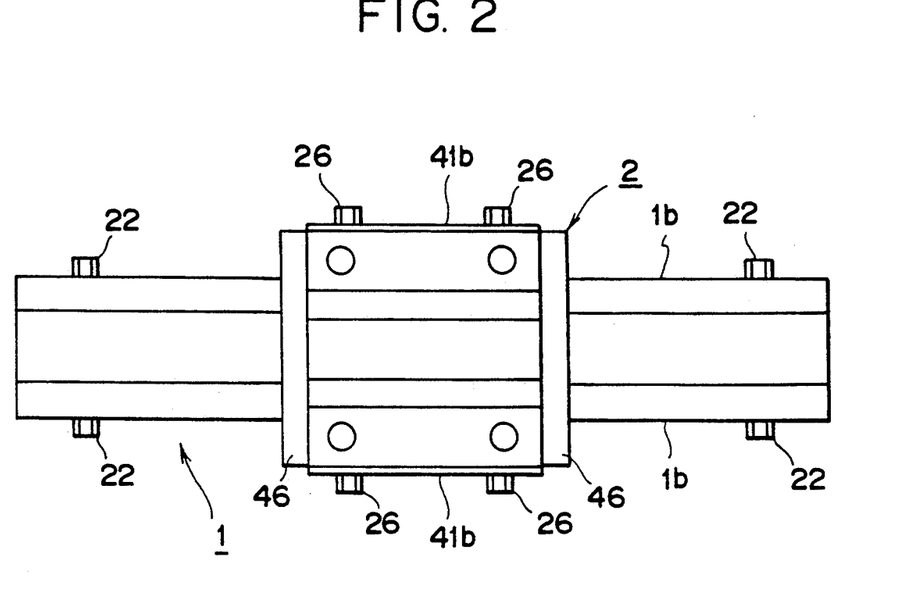
FIG. 2 is a plan view of the linear guide apparatus of FIG. 1.
Figure 4:
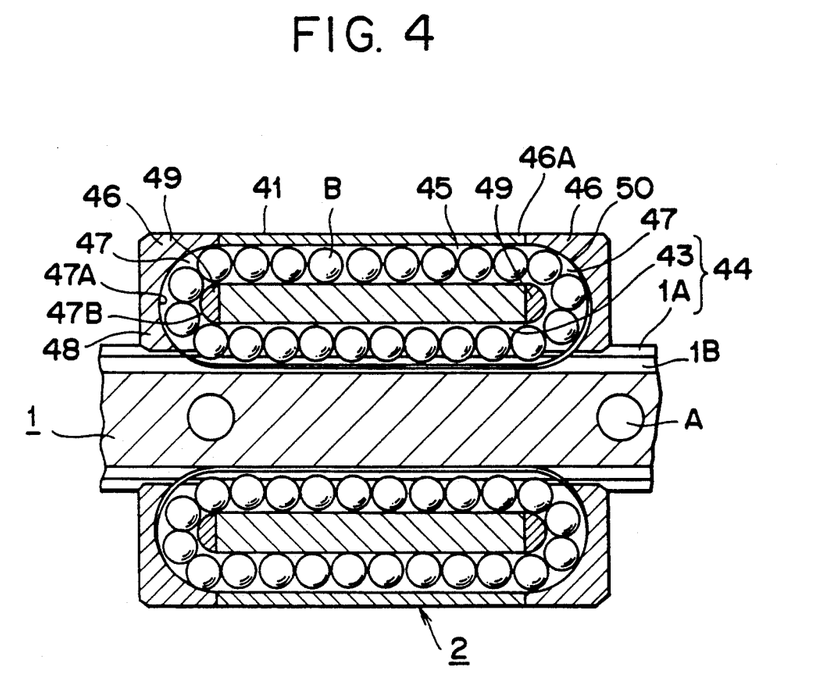
FIG. 4 is a sectional view taken along the line X—X in FIG. 2.

As shown in FIGS. 1 and 2, a guide rail 1 of a linear guide apparatus has a prismatic cross-section and extends in an axial direction, and is provided at its both side surfaces 1b with two axial ball rolling grooves 1A. A slider 2 has ball rolling grooves 43 opposed to the ball rolling grooves 1A of the guide rail 1 and freely ride on the guide rail 1 so that it can be linearly shifted in an axial direction of the guide rail 1 via the rolling movement of balls B rolling in the ball rolling grooves 1A, 43 as shown in FIG. 4.

The guide rail 1 and the slider 2 have lateral pushing structures, respectively.

Figure 3:
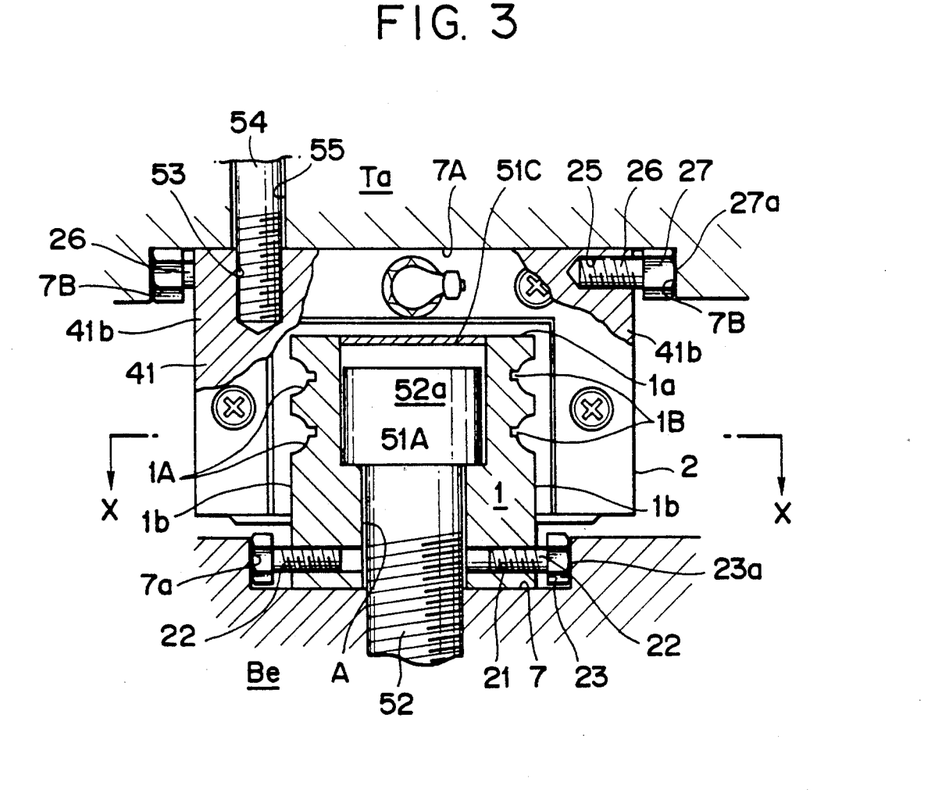
FIG. 3 is a cross-sectional view of the lateral push structure of the linear guide apparatus.

More particularly, as shown in FIG. 3, a plurality of threaded holes 21 (in the illustrated embodiment, two pairs of holes spaced along a longitudinal direction) are formed in the both side surfaces 1b of the guide rail 1 below the ball rolling grooves 1A. As shown in FIG. 2, the paired threaded holes 21 are disposed coaxially and are arranged at left and right end portions of the guide rail 1 and symmetrically in the longitudinal (axial) direction of the latter. As shown in FIG. 3, the threaded holes 21 are disposed at a position where they intersect with an attaching bolt receiving hole A passing through the guide rail 1 from its upper surface 1a to a lower surface 1d. The threaded holes pass through the guide rail laterally.

A bolt 22 having a hexagon head 23 with a hexagon recess is threaded into each threaded hole 21 as a lateral pushing bolt 22. A top surface 23a of the head 23 of each bolt is adapted to abut against a side surface of a recess 7 formed in a bed Be (attachment member) which is a base of the machine.

Further, a plurality of threaded holes 25 (in FIG. 1, two pairs of holes spaced along a longitudinal direction) are formed in both side surfaces 41b of a body 41 of the slider 2. As shown in FIG. 2, the threaded holes 25 formed in both side surfaces 41 are also disposed coaxially in a pair and are arranged symmetrically with respect to a shifting direction of the slider 2. Each threaded hole 25 is a blind hole (not through hole) into which a lateral pushing bolt 26 similar to the lateral pushing bolt 22 is threaded. Top surfaces 27a of heads 27 of the lateral pushing bolts 26 are adapted to abut against side surfaces of a recess 7A formed in the table Ta.

Next, the linear guide apparatus having the above-mentioned lateral pushing structure will be explained.

A narrow holder escaping groove 1B is formed in a bottom of each ball rolling groove 1A of the guide rail 1 along the axial direction of the latter (see FIGS. 3 and 4). On the other hand, ball rolling grooves 43 opposed to the ball rolling grooves 1A are formed in inner surfaces of both skirt portions 42 of the body 41 of the slider 2 riding on the guide rail 1, and these opposed ball rolling grooves 1A, 43 cooperate with each other to constitute a ball rolling path 44 as a loading path.

Ball returning passages 45 are formed in the skirt portions 42 of the slider body 41 in parallel with the ball rolling grooves 43, which passages extend in the axial direction. End caps 46 secured to both longitudinal ends of the slider body 41 each has an arcuate path 47 defined by a semi-circular outer guide surface 47A and a semi-circular inner guide surface 47B. The arcuate paths 47 serve to communicate the ball rolling path 44 which is the loading area with the ball returning passage 45 which is a non-loading area. Each outer guide surface 47A is formed to extend from a protruding portion 48 (which is to be fitted into the ball rolling groove 1A) formed on an inner surface of each end cap 46 to the ball returning passage 45. On the other hand, each inner guide surface 47B is formed by fitting a separately injection-molded guide member 49 into an abutment end surface 46A of each end cap 46.

A plurality of balls B are loaded in a ball circulating path constituted by the ball rolling path 44, ball returning passage 45 and arcuate paths 47. Holders 50 are mounted in the end caps 46 and serve to hold the balls B to prevent them from dropping out of the track grooves 43 of the slider 2 even when the slider 2 is dismounted from the guide rail 1. In a condition that the slider 2 is mounted on the guide rail 1, a straight portion of each holder 50 is received in the corresponding holder escaping groove 1B formed in the bottom of the ball rolling groove 1A of the guide rail so as not to interfere with the guide rail 1.

An attaching bolt 52 for attaching and securing the guide rail 1 to the bed Be has a threaded portion threaded into the bed Be, a shank portion received in the attaching bolt receiving hole A with an annular gap therebetween and a head 52a received in an upper enlarged portion of the receiving hole A with an annular gap therebetween not to protrude from the upper surface 1a of the guide rail 1. Further, a dust tape 51C is adhered to a recessed portion in the upper surface 1a of the guide rail along the whole length thereof. An attaching bolts 54 for attaching the slider 2 to the table Ta are threaded into threaded holes formed in the upper surface of the slider body 41, and an annular gap is maintained between each bolt 54 and a corresponding through hole 55 formed in the table Ta.

Next, the attachment of the guide rail 1 and the slider 2 of the linear guide apparatus to the machine will be explained with reference to FIGS. 1 to 5.

Figure 5:
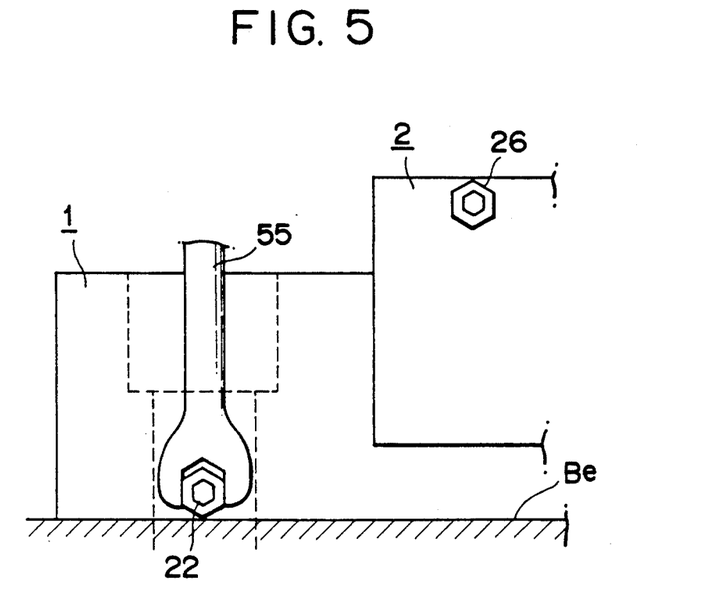
FIG. 5 is a schematic side view showing a condition that a lateral pushing bolt is handled by a spanner.

For example, the guide rail 1 is freely received in the linear guide apparatus attaching recess 7 previously formed in the bed Be of a lathe at a predetermined position, and the attaching bolt 52 is temporarily tightened by threading it half way. Then, as shown in FIG. 5, a spanner (tightening tool) 55 is engaged by the head 23 of the lateral pushing bolt 22 threaded into the threaded hole 21 of the guide rail 1 so that the lateral pushing bolt 22 is unthreaded. Consequently, the left and right lateral pushing bolts 22 are shifted to protrude from the side surfaces 1b of the guide rail until the top surfaces 23a of the heads of the bolts are abutted against the side surfaces 7a of the recess 7 of the bed, respectively. By performing this operation with respect to the left and right symmetrical lateral pushing bolts 22, the heads of the lateral pushing bolts 22 are abutted against both side surfaces of the recess 7, thereby urging the side surfaces. Due to the reaction forces generated from the urging forces of the bolts against the side surfaces, the guide rail 1 is shifted laterally, thereby laterally positioning the guide rail with respect to the bed Be.

In this case, even if the working accuracy for either one of the side surfaces 7a of the recess 7 of the bed Be is low and thus the side surface is slightly curved, by changing the threaded conditions of the pair of lateral pushing bolts 22, it is possible to finely adjust the guide rail 1 in the left and right direction (widthwise direction), with the result that the guide rail can be positioned with respect to the bed Be more correctly regardless of the working accuracy for the recess 7. Thereafter, the attaching bolt 52 for the guide rail 1 is finally tightened.

Further, in attaching the slider 2 to the table Ta, the slider 2 is housed in the recess 7A (for receiving the linear guide apparatus) previously formed in the table Ta at the predetermined position, and the attaching bolt 54 is temporarily tightened by rotating it half way. Then, the left and right lateral pushing bolts 26 threaded into the threaded holes 25 of the slider 2 is loosened by using the spanner 55 (this is done after the slider is shifted to a position where the spanner does not interfere with the bed Be) until the top surfaces 27a of the heads 27 of the bolts are abutted against both side surfaces 7B of the recess 7A to urge the latter. Due to the reaction forces generated from the urging forces of the bolts against the side surfaces, the slider 2 is shifted laterally, thereby positioning the slider.

In this case, even if the working accuracy for either one of the side surfaces 7B of the recess 7A of the bed Be is low and thus the side surface is slightly curved, by changing the threaded conditions of the pair of lateral pushing bolts 26, it is possible to finely adjust the slider in the left and right direction, with the result that the slider 2 can be positioned with respect to the table Ta more correctly regardless of the working accuracy for the recess 7A. Thereafter, the attaching bolt 54 for the slider 2 is finally tightened.

In this way, according to the illustrated embodiment, only by rotating the bolts 22, 26, the guide rail 1 and the slider 2 can stably by secured to the bed Be and the table Ta, respectively, while maintaining the straightness. Further, it is not necessary for the operator to prepare any lateral pushing plates and the like and to form threaded holes for attaching the lateral pushing plates in the table Ta and the bed Be. In addition, in the lathe and machining center, although a main spindle is sometimes erroneously struck against a saddle or a table, it is possible to effectively prevent the guide rail 1 and/or the slider 2 from deviating due to the impact force generated by such collision.

Figure 6:
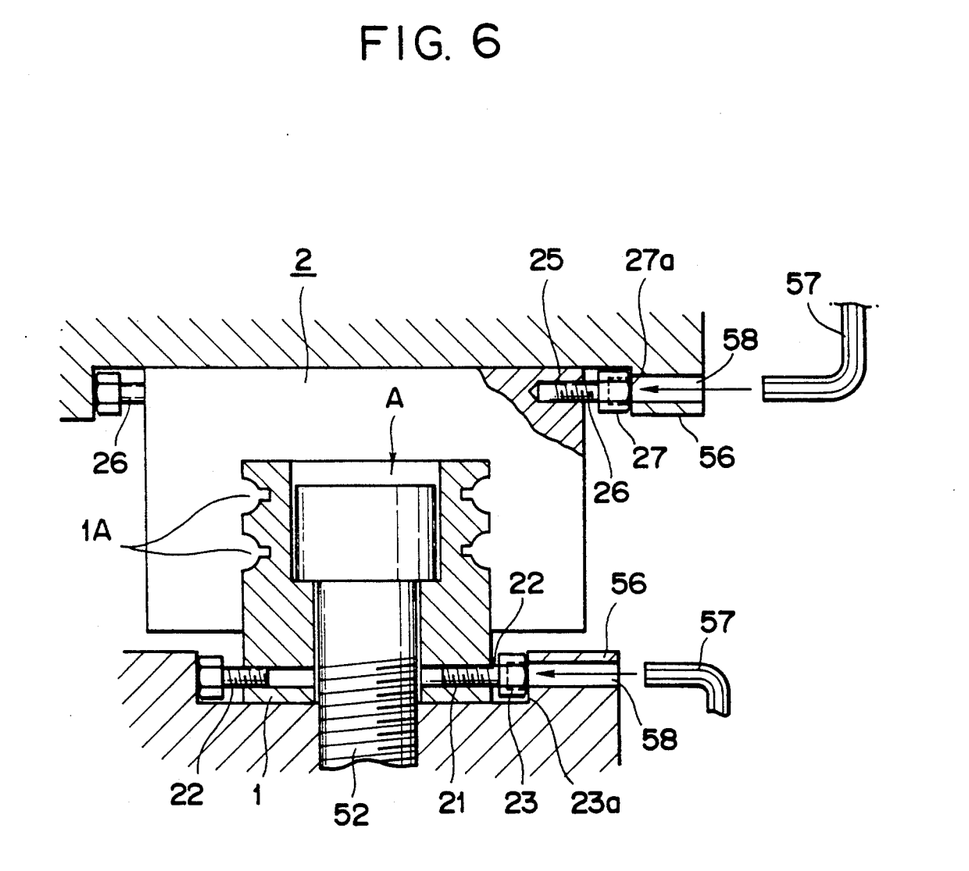
FIG. 6 is a schematic sectional view showing a condition that lateral pushing bolts are handled by hexagon wrenches.

FIG. 6 shows a second embodiment of an attachment structure.

In this embodiment, through holes 58 for passing through a wrench (bolt tightening tool) 57 are formed in banks 56 of the recesses 7, 7A (for receiving the slider 2 and the guide rail 1) formed in the table Ta and the bed Be. The lateral pushing bolts 22, 26 are driven or handled by the wrench passing through the through hole 58 and engaging the hexagon recess formed in the head 23, 27 of the lateral pushing bolt 22, 26.

Figure 7:
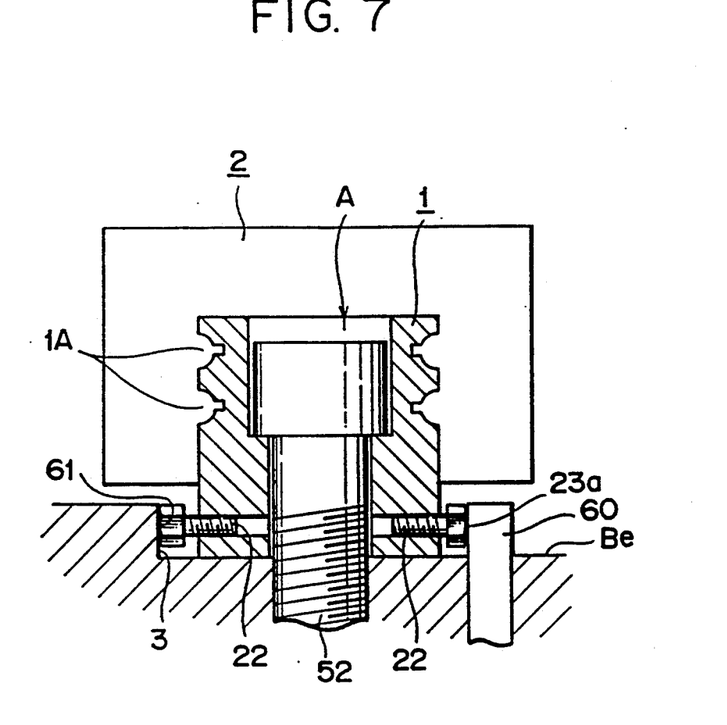
FIG. 7 is a schematic elevational sectional view showing another aspect for attachment of a guide rail by utilizing a lateral pushing structure.

FIG. 7 shows a third embodiment of an attachment structure. In this case, a step 3 with a side surface 61 is formed on the bed Be and a pin 60 is formed on the bed in opposition to the side surface 61. The guide rail 1 is rested in the step 3 between the side surface 61 and the pin 60. Then, similar to FIG. 5, the lateral pushing bolts 22 are unthreaded by using the spanner until the top surfaces 23a of the heads of the bolts 22 are abutted against the side surface 61 and the pin 60 to urge the latter. Due to the reaction forces, the guide rail 1 is shifted laterally. Incidentally, although not shown, it should be noted that similar attachment structure utilizing a pin can be adopted to the slider 2.

In the above-mentioned embodiments, while each lateral pushing bolt 22, 26 had the hexagon head, the present invention is not limited to this, but each lateral pushing bolt may have a square head, for example. Further, as shown in FIGS. 3 and 7, when the lateral pushing bolts 22, 26 are handled by the spanner, an easily available hexagon bolt having no hexagon recess may be used as the lateral pushing bolt. Furthermore, as shown in FIG. 6, when the lateral pushing bolts 22, 26 are handled by the wrench, an easily available bolt having a circular head with a hexagon recess may be used as the lateral pushing bolt.

Further, in place of the formation of the recess or step in the bed Be and the table Ta, for example, suitable pieces may be secured onto the surfaces of the table Ta and the bed Be by bolts, and end surfaces of such pieces may be used as reference surfaces. Also in this case, after the guide rail 1 and the slider 2 are temporarily secured by the attaching bolts 52, 54 at the attachment positions, by finely adjusting the positions of the lateral pushing bolts 22, 26 by the spanner, the predetermined straightness or parallelism can be obtained with respect to the guide rail 1 and the slider 2.

Incidentally, in the illustrated embodiments, the ball type linear guide apparatus using the balls B are rolling bodies was explained, the present invention can be applied to a roller type linear guide apparatus using rollers as rolling bodies.

What is claimed is:

1. A linear guide apparatus comprising at least one elongated guide rail adapted to be attached to a fixed member by a fastening member and being provided with a rolling body receiving groove at respective side surfaces thereof, and at least one slider having a saddle shape riding on said guide rail and adapted to be attached to a shiftable member and further having a pair of skirt portions each provided at an inner surface thereof with a rolling body receiving groove facing a respective one of said rail grooves, said slider being linearly displaceable on said guide rail, characterized in that:

at least one set of paired adjustment threaded holes are formed along a longitudinal direction of said guide rail, each pair of said adjustment threaded holes extending in a widthwise direction of said guide rail through both side surfaces of said guide rail at lower portions thereof and being axially aligned with each other, and adjusting threaded members are threaded into corresponding adjustment threaded holes in such a manner that outer ends of said threaded members protrude from said side surfaces of said guide rail; and a recess having a width greater than that of said guide rail is formed in a guide rail attachment surface of said fixed member and a fixing threaded hole for receiving said fastening member is formed in a bottom of said recess;

whereby, after a widthwise position of said guide rail on said fixed member has been adjusted by abutting the outer ends of said adjusting threaded members against side surfaces of said recess by rotating said adjusting threaded members, said guide rail is fixed to said fixed member by tightening said fastening member.

2. A linear guide apparatus according to claim 1, further comprising at least one additional pair of axially aligned adjustment threaded holes extending in a widthwise direction of said slider and arranged along a longitudinal direction of said slider in side surfaces of said slider at lower portions thereof, and second adjusting threaded members threaded into corresponding ones of the additional adjustment threaded holes of said slider in such a manner that outer ends of said second threaded members protrude from said side surfaces of said slider; and a recess having a width greater than that of said slider formed in a slider attachment surface of said shiftable member and a second fixing hole for receiving a second fastening member formed in a bottom of said recess;

whereby, after a widthwise position of said slider on said shiftable member has been adjusted by abutting the outer ends of said second adjusting threaded members against side surfaces of said recess by rotating said second adjusting threaded members, said slider is fixed to said shiftable member by tightening said second fastening member.

3. A linear guide apparatus comprising at least one elongated guide rail adapted to be attached to a fixed member and being provided with a rolling body receiving groove at respective side surfaces thereof, and at least one slider having a saddle shape riding on said guide rail and adapted to be attached to a shiftable member and further having a pair of skirt portions each provided at an inner surface thereof with a rolling body receiving groove facing a respective one of said rail grooves, said slider being linearly displaceable on said guide rail, characterized in that:

at least one set of paired adjustment threaded holes are formed along a longitudinal direction of said slider, each pair of said adjustment threaded holes extending in a widthwise direction of said slider through both side surfaces of said slider at lower portions thereof and being axially aligned with each other, and adjusting threaded members are threaded into corresponding adjustment threaded holes in such a manner that outer ends of said threaded members protrude from said side surfaces of said slider; and a recess having a width greater than that of said slider is formed in a slider attachment surface of said shiftable member and a fixing hole for receiving a fastening member is formed in a bottom of said recess;

whereby, after a widthwise position of said slider on said shiftable member has been adjusted by abutting the outer ends of said adjusting threaded members against side surfaces of said recess by rotating said adjusting threaded members, said slider is fixed to said shiftable member by tightening said fastening member.

* * * * *